United States Patent [19]

Kurokawa

[11] 3,838,364

[45] Sept. 24, 1974

[54] VARIABLE DELAY EQUALIZER COMPRISING HYBRID NETWORK TERMINATED BY TUNED AND VARIABLE REACTANCE CIRCUITS

[75] Inventor: Teruhisa Kurokawa, Tokyo, Japan

[73] Assignee: Nippon Electric Company, Limited, Tokyo, Japan

[22] Filed: Dec. 20, 1973

[21] Appl. No.: 426,754

[30] Foreign Application Priority Data

Dec. 23, 1972 Japan .................................. 47-1016

[52] U.S. Cl. ................................ 333/28 R, 333/11

[51] Int. Cl. .......................... H03h 7/14, H04b 3/04

[58] Field of Search ............ 333/11, 28 R, 31 R, 10

[56] References Cited

UNITED STATES PATENTS 2,994,828 8/1971 Ruthroff .......................... 333/11 X 3,706,947 12/1972 Jedrychowski et al............ 333/28 R

*Primary Examiner*—Paul L. Gensler

*Attorney, Agent, or Firm*—Sughrue, Rothwell, Mion, Zinn & Macpeak

[57] ABSTRACT

A delay equalizer for equalizing the relative delays of a band of frequencies without altering the absolute delay of a center frequency. The delay equalizer includes a hybrid circuit having input, output and two side branches. One of the side branches is terminated in its characteristic impedance. The other is terminated by a circuit which consists of a tuned LC circuit and a variable reactance circuit. Variation in the reactance of the variable reactance circuit alters the delays of all frequencies except the resonant frequency of the tuned circuit.

6 Claims, 5 Drawing Figures

VARIABLE DELAY EQUALIZER COMPRISING HYBRID NETWORK TERMINATED BY TUNED AND VARIABLE REACTANCE CIRCUITS

BACKGROUND OF THE INVENTION

The present invention relates to a variable delay equalizer for a frequency modulation signal transmission system.

In a frequency modulation (FM) signal transmission system, the variation of delay time in accordance with the signal frequency within a signal transmission frequency band results in transmission distortion, and therefore, it is important to equalize the relative delay time within the FM signal transmission frequency band. In order to exactly equalize the relative delay time, a delay equalizer capable of continuously varying the delay time frequency response is required.

On the other hand, it has been a common practice that in order to enhance the reliability of signal transmission lines, the same signal is transmitted through a plurality of transmission paths as in the case of the diversity transmission, and received at a receiving end either by synthesizing a resultant signal from the signals received through the respective transmission paths or by successively switching to the transmission path having the highest S/N ratio. In this case, in addition to the requirement that the relative delay time of each transmission path within the transmission band must be small, it is necessary to minimize the difference in transmission time of the signal, that is, the difference in absolute delay time of the signal between the respective transmission paths. Accordingly, when the relative delay time of the respective transmission paths is equalized, it is desirable to keep the absolute delay time at a given reference frequency invariable.

However, the variable delay equalizers in the prior art generally had a disadvantage that upon varying the relative delay time within the transmission band, the absolute delay time as a whole within the transmission band, that is, the delay time at the reference frequency is also varied.

It is an object of the present invention to provide a variable delay equalizer capable of varying the relative delay time within the transmission band without varying the absolute delay time at a reference frequency within the transmission band such as, for instance, at the carrier frequency.

SUMMARY OF THE INVENTION

According to the present invention, one branch arm of a hybrid network is terminated by an impedance element having the characteristic impedance of said branch arm, and to the other branch arm having a characteristic impedance $Z_o$ is connected a terminating circuit consisting of a tuning circuit and a variable reactance circuit (variable susceptance) and having a composite impedance X. The tuning circuit and the variable reactance circuit are arranged and connected in such manner that at the resonant frequency of said tuning circuit the value of $2Z_o/Z_o^2 + X^2 \cdot dX/d\omega$ may be determined solely by the impedance elements of said tuning circuit independently of said variable reactance circuit, where $\omega$ represents angular frequencies of the signals within the transmission band. The resonant frequency of said tuning circuit may be selected as reference frequency of said transmission band. Consequently, at said reference frequency, the delay time represented by $\tau = 2Z_o/Z_o^2 + X^2 \cdot dX/d\omega$ is kept constant even if the reactance of the variable reactance circuit may be varied. However, at any frequency other than the reference frequency, the relative delay time within the transmission band may be varied depending upon the reactance of the variable reactance circuit. It is to be noted that the delay equalizer which comprises said hybrid network and the associated circuits, is serially inserted into a transmission path with an input arm and an output arm of said hybrid network connected therein.

DETAILED DESCRIPTION OF THE PREFERRED EMBODIMENTS

Figure 1:
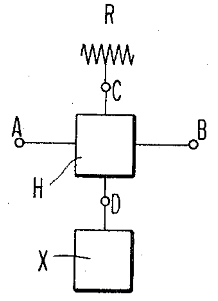
FIG. 1 is a block diagram for explaining the principle of operation of the variable delay equalizer according to the present invention.

In FIG. 1 showing a schematic circuit diagram to be used for the explanation of a variable delay equalizer to which the present invention is applicable, reference numeral H designates a hybrid transformer; A, its input arm; C and D, its first and second branch arms, respectively; and B, represents its output arm. The first branch arm C is terminated by a nonreflective terminating resistance element R having a characteristic impedance of said branch arm, and the second branch arm D is connected to a terminating circuit X. Signals applied to the input arm A are branched by the hybrid transformer H and fed to the branch arms C and D, respectively. The signals branched to the branch arm C are absorbed by the terminating resistance element R. Whereas, the signals branched to the branch arm D are totally reflected by the terminating circuit X while being subjected to a phase shift, and again applied to the hybrid transformer H, where the signals are branched to the input arm A and the output arm B. The reflected wave branched to the input arm A is absorbed by the impedance of the signal source connected to the input arm A. The signals branched to the output arm B can be utilized as output signals from the variable delay equalizer. The delay time between the input and output arms is determined by the amount of phase shift introduced upon reflection by the terminating circuit X. The phase difference $\theta$ between the incident wave and the reflected wave to and from the terminating circuit is represented by $$\theta = 2 \tan^{-1} X/Z_o, \quad (1)$$

where $Z_o$ is a characteristic impedance of the branch arm D, and X represents the reactance value of the terminating circuit X, and accordingly, the delay time $\tau$ is represented by $$\tau = d\theta/d\omega = 2Z_o/Z_o^2 + X^2 \cdot dX/d\omega, \quad (2)$$

where $\omega$ represents the angular frequencies of the signals.

In such type of prior art variable delay equalizers, there is a variable delay equalizer in which a parallel tuning circuit consisting of an inductive element and a capacitive element is used as the terminating circuit X of the variable delay equalizer illustrated in FIG. 1, whereby the relative delay time may be varied by varying the inductance and/or capacitance of the tuning circuit. In case of such circuit arrangement, it is obvious from Equation (2) above that the absolute delay time at a particular frequency cannot be maintained constant when the inductance and/or capacitance is varied. As described, the variable delay equalizers in the prior art generally had it as a principal object to equalize the relative delay time within the transmission band, and no attention was paid to the variation of the absolute delay time caused by the adjustment of the relative delay time.

Figure 2:
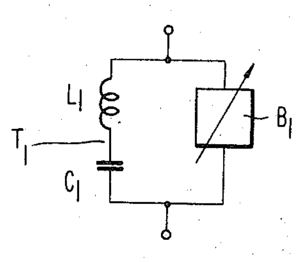
FIG. 2 is a partially schematic circuit diagram showing one example of the terminating circuit to be used in the variable delay equalizer shown in FIG. 1.

In the variable delay equalizer according to the present invention, the terminating circuit X shown in FIG. 1 consists of a tuning circuit and a variable reactance circuit, for instance, it comprises a series tuning circuit $T_1$ consisting of an inductive element $L_1$ and a capacitor $C_1$ connected in series and a variable susceptance element $B_1$ connected in parallel to said series tuning circuit, as shown in FIG. 2. The delay time $\tau_1$ introduced by the delay equalizer when the circuit shown in FIG. 2 is employed as the terminating circuit X in FIG. 1, is represented by $$\tau_1 = 2Z_o/(1-\omega^2 L_1 C_1)^2 + [\{B_1(1-\omega^2 L_1 C_1) + \omega C_1\}Z_o]^2 \cdot \{dB_1/d\omega\,(1-\omega^2 L_1 C_1)^2 + C_1\,(1-\omega^2 L_1 C_1) + 2\omega^2 L_1 C_1^2\}, . \quad (3)$$

where $L_1$ represents an inductance of the inductive element $L_1$, $C_1$, a capacitance of the capacitor $C_1$; and $B_1$, a susceptance of the variable susceptance element $B_1$. Now representing by $\omega_1$ the angular frequency which satisfies the equation $1 - \omega^2 L_1 C_1 = 0$, at the angular frequency of $\omega = \omega_1$ the following relation can be obtained:

$$\tau_1 = 4L_1/Z_o$$

That is, the angular frequency $\omega = \omega_1$ is the resonant angular frequency of the tuning circuit $T_1$, and at this particular angular frequency, the delay time $\tau_1$ is not affected by the susceptance element $B_1$ connected in parallel and determined solely by the tuning circuit $T_1$, and thus said delay time $\tau_1$ is kept constant even if the susceptance $B_1$ is varied.

Figure 3:
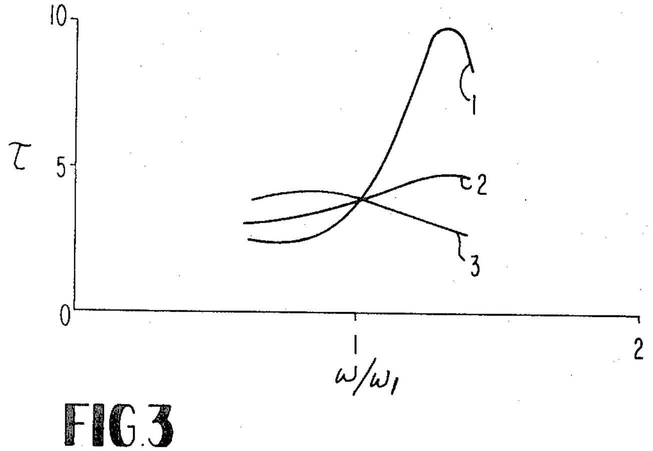
FIG. 3 is a diagram showing the time delay frequency response curves for the case where the terminating circuit illustrated in FIG. 2 is employed.

Taking the frequency $\omega_1$ as a reference frequency in the circuit of FIG. 2, by varying the parallel susceptance $B_1$ the relative delay time can be varied without changing the absolute delay time at said reference frequency. The delay time frequency response when a variable capacitor is employed as the variable susceptance element $B_1$ is shown in FIG. 3. The symbols $\omega$, $\omega_1$ and $\tau$ in FIG. 3 are used in the same sense as defined previously. In this figure, curves 1, 2 and 3 represent the time delay frequency response curves when the capacitance of the parallel-connected susceptance element $B_1$ is selected at $C_1$, $\frac{1}{2}C_1$ and $1/10\ C_1$, respectively, in case where the following relation is valid:

$$1/\omega_1 C_1 Z_o = \omega_1 L_1/Z_o = 1$$

From FIG. 3 it is seen that at the frequency of $\omega = \omega_1$ the delay time is not varied with the variation of the susceptance $B_1$, but it is varied within the frequency bands above and below said frequency. Therefore, if the resonant frequency $\omega_1$ is selected as a reference frequency, the relative delay time within the transmission band can be varied without varying the delay time at said reference frequency.

Figure 4:
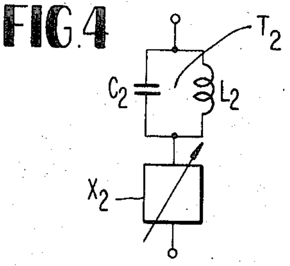
FIG. 4 is a schematic circuit diagram showing another example of the terminating circuit to be used in the variable delay equalizer shown in FIG. 1.

According to a second embodiment of the present invention, as shown in FIG. 4, the terminating circuit X can be constituted by serially connecting a parallel tuning circuit $T_2$ consisting of an inductive element $L_2$ and a capacitor $C_2$ connected in parallel and a variable reactance element $X_2$. Then, the delay time $\tau_2$ introduced by the delay equalizer is represented by $$\tau_2 = 2Z_o/Z_o^2\,(1-\omega^2 L_2 C_2)^2 + \{\omega L_2 + X_2\,(1-\omega^2 L_2 C_2)\}^2 \cdot \{L_2\,(1+\omega^2 L_2 C_2) + dX_2/d\omega\,(1-\omega^2 L_2 C_2)^2\}, \quad (4)$$

where $L_2$ represents an inductance of the inductive element $L_2$, $C_2$ represents a capacitance of the capacitor $C_2$, and $X_2$ represents a reactance of the variable reactance element $X_2$. Here, representing by $\omega_2$ the resonant angular frequency of the tuning circuit $T_2$ which satisfies the equation $1-\omega^2 L_2 C_2 = 0$, at the angular frequency of $\omega = \omega_2$ the following relation can be obtained:

$$\tau_2 = 4\,Z_o\,C_2$$

Figure 5:
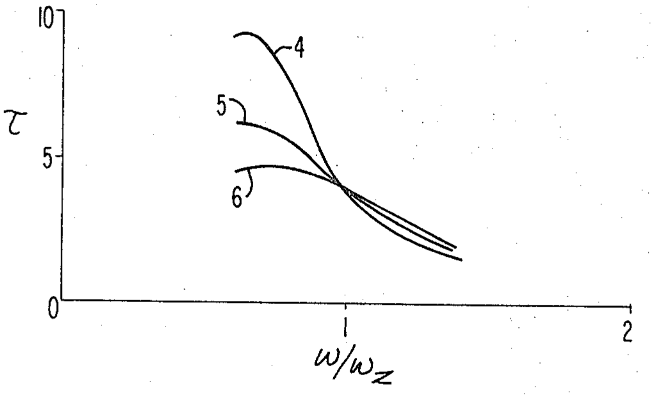
FIG. 5 is a diagram showing the time delay frequency response curves for the case where the terminating circuit illustrated in FIG. 4 is employed.

That is, the delay time $\tau_2$ at this particular angular frequency of $\omega = \omega_2$ is kept constant independently of the serially connected reactance $X_2$. In this case also, taking the frequency $\omega_2$ as a reference frequency, and if the serially connected reactance $X_2$ is varied, then the relative delay time can be varied without varying the absolute delay time at the reference frequency. The delay time frequency response when a variable capacitor is employed as the variable reactance element $X_2$ is shown in FIG. 5. In this figure, the symbols $\omega$, $\omega_2$ and $\tau$ are used in the same sense as defined previously. Curves 4, 5 and 6 represent the time delay frequency response curves when the capacitance of the serially connected reactance element $X_2$ is selected at $\mathbf{2C_2}$, $\mathbf{4C_2}$ and $\mathbf{10C_2}$, respectively, in case where the following relation is valid:

$$\omega_2\,C_2\,Z_0 = Z_o/\omega_2\,L_2 = 1$$

It will be seen from FIG. 5 that at the frequency of $\omega = \omega_2$ the delay time is not varied with the variation of the reactance $X_2$, but is varied within the frequency bands above and below said frequency. Therefore, if the resonant frequency $\omega_2$ is selected as a reference frequency, then similarly to the case of FIG. 3, the relative delay time can be varied without varying the delay time at said reference frequency.

As described above, when the variable delay equalizer according to the present invention is utilized in a radio relay system such as, for instance, a microwave diversity transmission system having a plurality of the transmission paths, an advantage can be obtained in that it is possible to equalize the relative delay time within the transmission frequency band without varying the absolute delay time of the transmission line and thereby the adjustment for the frequency response of the transmission line may be facilitated.

What is claimed is:

1. A variable delay equalizer comprising a hybrid network having an input arm, a first branch arm, a second branch arm and an output arm, an impedance element terminating said first branch arm and having an impedance equal to the characteristic impedance of said first branch arm, and a terminating circuit having an impedance X and connected to said second branch arm having a characteristic impedance $Z_o$; characterized in that said terminating circuit comprises a tuned circuit and a variable reactance circuit which are arranged and connected in such manner that at the resonant frequency of said tuned circuit the value $2Z_o/Z_o^2 + X^2 \cdot dX/d\omega$ is independent of said variable reactance, and where $\omega$ represents angular frequencies of the signals to be transmitted through said variable delay equalizer.

2. A variable delay equalizer as claimed in claim 1, wherein said tuned circuit is a series tuned circuit consisting of an inductive element having an inductance $L_1$ and a capacitive element having a capacitance $C_1$ and wherein said variable reactance circuit is connected in parallel with said tuned circuit, whereby at the resonant frequency $\omega_1 = 1/\sqrt{L_1 C_1}$, the value of $2Z_o/Z_o^2 + X^2 \cdot dX/d\omega$ is equal to $4L_1/Z_o$.

3. A variable delay equalizer as claimed in claim 1, wherein said tuned circuit is a parallel tuning circuit consisting of an inductive element having an inductance $L_2$ and a capacitive element having a capacitance $C_2$ connected in parallel, and wherein said variable reactance circuit is connected in series with said parallel tuned circuit, whereby at the resonant frequency $\omega_2 = 1/\sqrt{L_2 C_2}$, the value of $2Z_o/Z_o^2 + X^2 \cdot dX/d\omega$ is equal to $4Z_oC_2$.

4. A variable delay equalizer comprising a hybrid network having an input arm, an output arm, and first and second branch arms, an impedance equal in value to the characteristic impedance of said first branch arm connected to terminate said first branch arm, and a terminating circuit connected to terminate said second branch arm, said terminating circuit consisting of a tuned LC circuit connected to a variable reactance circuit.

5. A variable delay equalizer as claimed in claim 4 wherein said tuned LC circuit is a series LC circuit and said variable reactance is connected in parallel to said series tuned LC circuit.

6. A variable delay equalizer as claimed in claim 4 wherein said tuned LC circuit is a parallel LC circuit and said variable reactance is connected in series with said parallel tuned LC circuit.

* * * * *